(12) United States Patent
Zhou et al.

(10) Patent No.: US 11,543,264 B1
(45) Date of Patent: Jan. 3, 2023

(54) METHODS AND APPARATUS FOR NAVIGATING AN AUTONOMOUS VEHICLE BASED ON A MAP UPDATED IN REGIONS

(71) Applicant: PlusAI, Inc., Cupertino, CA (US)

(72) Inventors: Mianwei Zhou, Santa Clara, CA (US); Yibo Chen, San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/678,436

(22) Filed: Feb. 23, 2022

(51) Int. Cl.
*G01C 21/00* (2006.01)
*B60W 40/02* (2006.01)

(52) U.S. Cl.
CPC ......... *G01C 21/3889* (2020.08); *B60W 40/02* (2013.01); *G01C 21/3833* (2020.08); *G01C 21/3837* (2020.08); *G01C 21/3893* (2020.08); *G01C 21/3896* (2020.08); *B60W 2556/50* (2020.02)

(58) Field of Classification Search
CPC ............ G01C 21/3889; G01C 21/3833; G01C 21/3837; G01C 21/3893; G01C 21/3896; B60W 40/02; B60W 2556/50
See application file for complete search history.

(56) References Cited

U.S. PATENT DOCUMENTS

| | | | |
|---|---|---|---|
| 9,612,123 B1 | 4/2017 | Levinson et al. | |
| 2006/0173614 A1* | 8/2006 | Nomura | G01C 21/3889 |
| | | | 701/425 |
| 2018/0188045 A1* | 7/2018 | Wheeler | G01C 21/3848 |
| 2019/0084577 A1* | 3/2019 | Nobre | B60W 50/0097 |
| 2019/0271559 A1* | 9/2019 | Colgate | G06V 10/82 |
| 2020/0245115 A1* | 7/2020 | Dorrance | H04W 4/44 |
| 2020/0408536 A1* | 12/2020 | Fasola | G01C 21/3807 |
| 2021/0004613 A1* | 1/2021 | Yang | G06V 10/82 |
| 2021/0086797 A1* | 3/2021 | Matsunaga | B60W 60/0053 |
| 2021/0180959 A1* | 6/2021 | Muto | G08G 1/0129 |
| 2021/0310823 A1* | 10/2021 | Wilbers | G01C 21/3815 |
| 2021/0396524 A1* | 12/2021 | Toutov | G01C 21/005 |

(Continued)

FOREIGN PATENT DOCUMENTS

| | | | | |
|---|---|---|---|---|
| JP | 2002054934 A | * | 2/2002 | ........... G08G 1/0969 |
| JP | 2002148051 A | * | 5/2002 | ............. G08G 1/137 |

(Continued)

*Primary Examiner* — Dale W Hilgendorf
(74) *Attorney, Agent, or Firm* — Sheppard Mullin Richter & Hampton LLP

(57) ABSTRACT

In an embodiment, a method comprises detecting, at a processor of an autonomous vehicle, a discrepancy between a map and a property sensed by at least one sensor onboard the autonomous vehicle, the property being associated with an external environment of the autonomous vehicle. In response to detecting the discrepancy, and based on the discrepancy, an annotation for the map is generated via the processor. A signal representing the annotation is caused to be transmit to a compute device that is remote from the autonomous vehicle. A signal representing a map update is received from the compute device that is remote form the autonomous vehicle. The map update is generated based on the annotation, the map update (1) including replacement information for a region of the map associated with the annotation, and (2) not including replacement information for a remainder of the map.

22 Claims, 4 Drawing Sheets

(56) References Cited

U.S. PATENT DOCUMENTS

2022/0057230 A1* 2/2022 Pohl .................... G01C 21/3841
2022/0146278 A1* 5/2022 Takeda .................. H04W 4/024

FOREIGN PATENT DOCUMENTS

| JP | 2008145154 A | * | 6/2008 | .......... B60W 30/146 |
| KR | 20100008386 A | * | 1/2010 | ....... G08G 1/096855 |
| WO | WO-2007055086 A1 | * | 5/2007 | ............. G01C 21/32 |

* cited by examiner

Detect a difference between (1) sensor data generated by at least one sensor onboard an autonomous vehicle, and (2) a map stored in a memory operably coupled to the processor, the sensor data being associated with an external environment of the autonomous vehicle
402

Generate, in response to detecting the difference between the sensor data and the map, an annotation for the map
404

Cause transmission of a first signal representing the annotation to a compute device that is remote from the autonomous vehicle
406

Receive, from the compute device that is remote from the autonomous vehicle, a second signal representing a map update, the map update generated based on the annotation, the map update (1) including replacement information for a region of the map associated with the annotation, and (2) not including replacement information for a remainder of the map
408

Navigate the autonomous vehicle based on the updated map
410

Figure 4

METHODS AND APPARATUS FOR NAVIGATING AN AUTONOMOUS VEHICLE BASED ON A MAP UPDATED IN REGIONS

FIELD

In one or more embodiments, an autonomous vehicle is navigated based on a map, where only regions of the map associated with a discrepancy are updated, and other regions of the map not associated with the discrepancy are not updated.

BACKGROUND

Vehicles, such as autonomous vehicles, may rely on maps for navigating. Maps can become out of date, however, as topographies change (e.g., new roads built). One method to update a map is to send a mapping vehicle to an area that is to be updated. Data collected by the mapping vehicle can be used to publish updated maps (e.g., every month, every quarter). Such a technique, however, can be slow and often updates the entire map, including portions of the map that are not out of date.

SUMMARY

In some implementations, a method comprises receiving, at a processor, a signal representing an indication of a sensed property. The sensed property is associated with an external environment of an autonomous vehicle, and the sensed property is sensed by at least one sensor onboard the autonomous vehicle during operation of the autonomous vehicle within the external environment. A map region to be updated is identified based on the indication of the sensed property. The map region is included within a plurality of map regions of a map. The map includes data associated with a plurality of different sensor types, and the map region to be updated is identified during operation of the autonomous vehicle within the external environment. A signal representing a map update is caused to be transmitted, during operation of the autonomous vehicle within the external environment. The map update includes replacement information for the map region and does not including replacement information for any other map region from the plurality of map regions of the map.

In some implementations, a method comprises detecting, at a processor of an autonomous vehicle, a discrepancy between a map and a property sensed by at least one sensor onboard the autonomous vehicle, the property being associated with an external environment of the autonomous vehicle. In response to detecting the discrepancy, and based on the discrepancy, an annotation for the map is generated via the processor. A signal representing the annotation is caused to be transmitted to a compute device that is remote from the autonomous vehicle. A signal representing a map update is received from the compute device that is remote form the autonomous vehicle. The map update is generated based on the annotation. The map update (1) includes replacement information for a region of the map associated with the annotation, and (2) does not include replacement information for a remainder of the map.

In some implementations, a non-transitory, processor-readable medium stores processor-executable instructions to cause a processor to detect a difference between (1) sensor data generated by at least one sensor onboard an autonomous vehicle, and (2) a map stored in a memory operably coupled to the processor. The sensor data is associated with an external environment of the autonomous vehicle. In response to detecting the difference between the sensor data and the map, an annotation for the map is generated. A first signal representing the annotation is caused to be transmitted to a compute device that is remote from the autonomous vehicle. A second signal representing a map update is received from the compute device that is remote from the autonomous vehicle. The map update is generated based on the annotation. The map update (1) includes replacement information for a region of the map associated with the annotation, and (2) does not include replacement information for a remainder of the map. The autonomous vehicle is navigated based on the updated map.

BRIEF DESCRIPTION OF THE DRAWINGS

FIG. 4 shows a flowchart of a method for updating a region of a map to generate an updated map for navigating an autonomous vehicle, according to an embodiment.

DETAILED DESCRIPTION

Vehicles, such as semi-autonomous vehicles and fully autonomous vehicles, can rely on maps during navigation. As a result, it can be desirable for the maps to be accurate and up to date. If, for example, a road is shut down, under construction or newly constructed, it can be desirable for the maps to be updated accordingly in a manner that is quick and efficient; otherwise, a vehicle may rely on a map that is out of date.

In that context, the techniques described herein are related to detecting a discrepancy between a region (i.e., portion, subset, section) of a map and an environment of a vehicle, and causing the region of the map to be updated to account for the discrepancy. In some implementations, circuitry of an autonomous vehicle may determine a discrepancy between a particular map region of a map (that includes multiple map regions) and a property of an environment the autonomous vehicle is travelling in. For example, the property may be the presence of a new road or building, and the discrepancy may be that the new road or building is not included in the map. In response, the circuitry of the autonomous vehicle can indicate such a discrepancy by generating an annotation for the map, where the annotation can include enough information such that the map region of the locally-store map is updated to account for the discrepancy (e.g., location of new road, number of lanes in the new road, size of new building, etc.). The annotation can then be sent to a remote compute device to generate a software patch (i.e., map update). Thereafter, the map update can be sent from the remote compute device to the autonomous vehicle and/or other autonomous vehicles for updating the map region of the map included in each autonomous vehicle without having to update other regions of the map not associated with the discrepancy.

The techniques described herein can provide several advantages. For example, only the region of the map associated with the discrepancy (referred to as "map region") is updated, while other regions of the map not associated with the discrepancy are not updated; this allows updates to be performed quickly (because the entire map does not need to be updated) and with reduced amounts of data (because the size of the map update is only for the map region and not the entire map). As a result, the map can be updated for example within hours, even as the vehicle is operating.

Figure 1:
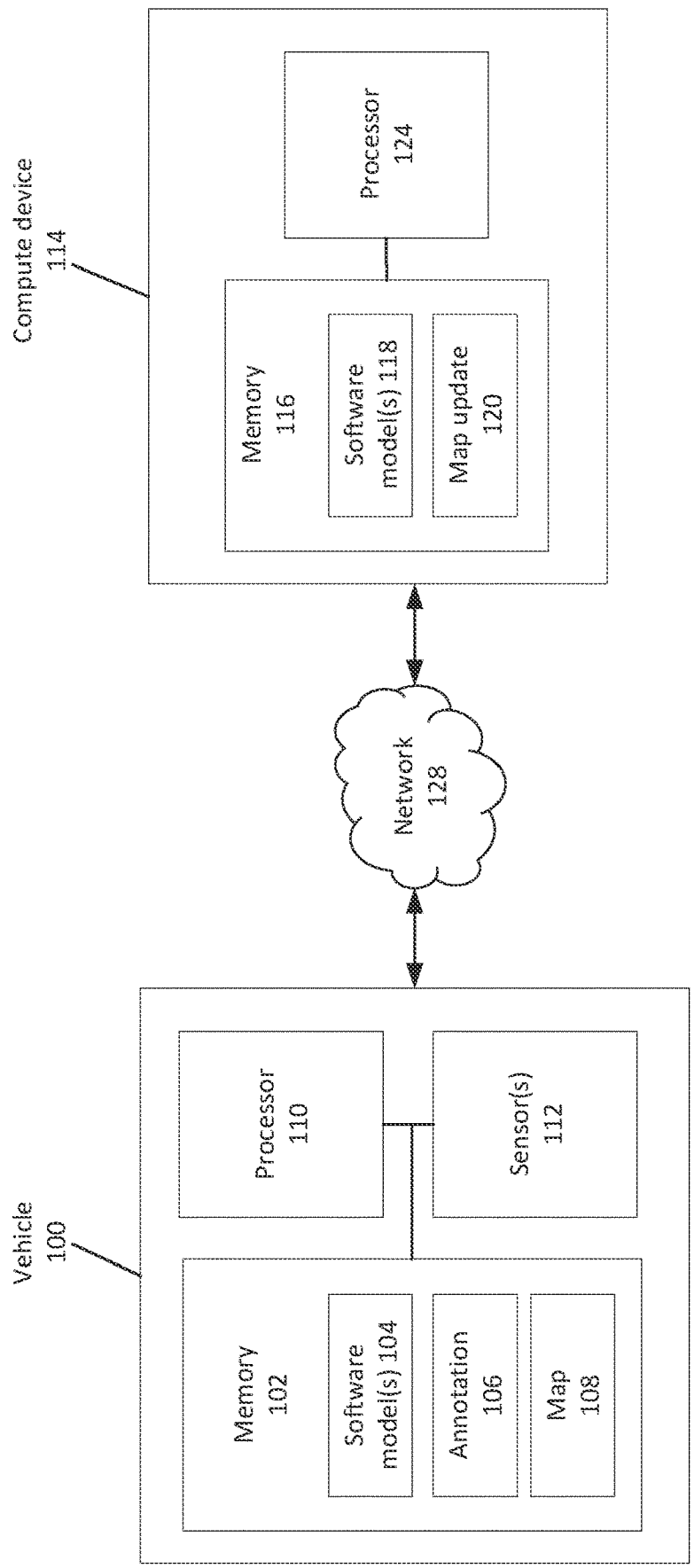
FIG. 1 shows a block diagram of a system for updating a region of a map associated with a discrepancy, while not updating other regions of the map not associated with the discrepancy, according to an embodiment.

FIG. 1 shows a system for updating a map, according to an embodiment. FIG. 1 includes a vehicle 100 communicably coupled to a compute device 114 via a network 128. The vehicle 100 includes a processor 110, sensor(s) 112, and memory 102 storing a software model(s) 104, annotation 106, and map 108. The memory 102, processor 110, and sensor(s) 112 included in the vehicle 100 can be operatively coupled to one another (e.g., via a system bus). The compute device 114 includes a processor 124 and memory 116 storing a software model(s) 118 and a map update 120. The memory 116 and processor 124 included in the compute device 114 can be operatively coupled to one another (e.g., via a system bus).

The network 128 can be any suitable communications network(s) for transferring data, operating over public and/or private networks. For example, the network 128 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the communication network 128 can be a wireless network such as, for example, a Wi-Fi or wireless local area network ("WLAN"), a wireless wide area network ("WWAN"), and/or a cellular network. In other instances, the communication network 128 can be a wired network such as, for example, an Ethernet network, a digital subscription line ("DSL") network, a broadband network, and/or a fiber-optic network. The network 128 can be a combination of a wired network(s) and a wireless network(s). In some instances, the network can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 128 can be encrypted or unencrypted. In some instances, the network 128 can include multiple networks or subnetworks operatively coupled to one another by, for example, network bridges, routers, switches, gateways and/or the like (not shown in FIG. 1).

In some implementations, the vehicle 100 can operate in only a manual driving mode, only a semi-autonomous driving mode, only a fully autonomous driving mode, or in a combination thereof (i.e., switchable between at least two of the manual driving mode, the semi-autonomous driving mode, or the fully autonomous driving mode). In some implementations, the vehicle is at least one of: a semi-truck, a medium truck, a heavy truck, a very heavy truck, greater than 14,000 pounds, greater than 26,000 pounds, greater than 70,000 pounds, or greater than 80,000 pounds. Having accurate maps can be desirable for larger/heavier vehicles because, for example, accidents caused by larger/heavier vehicles can be more dangerous (e.g., cause more damage) compare to smaller/lighter vehicles.

The sensor(s) 112 can include one or more sensors for collecting sensor data. The sensor(s) 112 can be used to observe and gather any information that would be useful for performing the techniques discussed herein, such as information associated with an external environment of the vehicle 100 and/or the vehicle 100 itself. The sensor(s) 112 can include, for example, at least one of an inertial measurement unit (IMU), camera, a radar, or a lidar. The sensor(s) 112 can collect sensor data that includes representations of attributes associated with the vehicle 100, such as the vehicle's 100 speed, location, acceleration, size, weight, etc. Additionally or alternatively, the sensor(s) 112 can collect sensor data that includes representations of attributes associated with an external environment of the vehicle 100, such as a speed, location, acceleration, size, type, relative distance, movement pattern, etc. of other vehicles, pedestrians, animals, obstacles, etc., and/or location, type, relative distance, size, shape, etc. of signs, lane markers, shoulder areas, roads, buildings, etc. In some implementations, sensor data collected by the sensor(s) 112 includes information of a topography surrounding the vehicle 100 that is relevant for including in a map, such as a road, sign, traffic light, walkway, building, body of water, etc.

The processor 110 can be, for example, a hardware based integrated circuit (IC) or any other suitable processing device configured to run and/or execute a set of instructions or code. For example, the processor 110 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 110 can be configured to run any of the methods and/or portions of methods discussed herein.

The memory 102 can be, for example, a random-access memory (RAM), a memory buffer, a hard drive, a read-only memory (ROM), an erasable programmable read-only memory (EPROM), and/or the like. The memory 102 can be configured to store sensor data collected by the sensor(s) 112, data received from a separate compute device (e.g., compute device 114), and any other data used by the processor 110 to perform the techniques discussed herein. In some instances, the memory 102 can store, for example, one or more software programs and/or code that can include instructions to cause the processor 110 to perform one or more processes, functions, and/or the like. In some implementations, the memory 102 can include extendible storage units that can be added and used incrementally. In some implementations, the memory 102 can be a portable memory (for example, a flash drive, a portable hard disk, and/or the like) that can be operatively coupled to the processor 110. In some instances, the memory 102 can be remotely operatively coupled with a compute device (not shown). For example, a remote database device can serve as a memory and be operatively coupled to the vehicle 100.

The memory 102 stores a representation of a map 108. The map 108 includes information that is used and/or could be relevant for the vehicle 100 to navigate, such as information associated with roads, traffic signs, and obstacles (e.g., buildings, barriers). The map 108 is made up of several regions (i.e., map regions), where each region can be associated with a logical identifier. In some implementations, the logical identifiers can be used to identify which map region is to be updated (discussed in more detail below). The area of land/water making up the map 108 and map regions can be any shape, such as a square, rectangle, circle, hexagon, irregular shape, etc.

The areas of land and/or water making up the map 108 and map regions can vary. The map 108 can be, for example, a map of a country, state, city, neighborhood, or any other area of land/water. The map regions can be regions that, together, make up the area defining the map 108. For example, if the map 108 is of New York City, the map regions can include the Bronx, Brooklyn, Manhattan, Queens, and Staten Island. As another example, if the map 108 is of Manhattan, the map regions can include uptown Manhattan, downtown Manhattan, midtown Manhattan, and West Side. As another example, if the map 108 is of midtown Manhattan, the map regions can include Rockefeller Center, Diamond District, Times Square, Hudson Yards, Koreatown, Madison Square, etc.

The memory 102 also stores a software model(s) 104. The software model(s) 104 can be, for example, an artificial intelligence (AI) model(s), a machine learning (ML) model(s), an analytical model(s), and/or a mathematical model(s). In some implementations, the software model(s) 104 can analyze sensor data collected by the sensor(s) 112 to determine if a discrepancy exists between a sensed property associated with the external environment of the vehicle 100 and the map 108. The sensed property can be any attribute associated with the external environment of the vehicle 100 that may be discrepant with information included in the map 108. For example, the sensed property could be that a road, obstacle, or traffic sign is determined to be present based on sensor data collected by the sensor(s) 112, and the discrepancy could be that the sensed road, obstacle, or traffic sign is not currently present in the map 108. As another example, the sensed property could be a road, obstacle, or traffic sign that is determined to be not present based on sensor data collected by the sensor(s) 112, and the discrepancy could be that the sensed road, obstacle, or traffic sign is currently present in the map 108. In some implementations, the sensed property is an attribute associated with a road the vehicle 100 is travelling in, such as a shape of the road, number of lanes in the road, whether a road is available (e.g., not closed for construction), angle of the road (e.g., bank angle, incline angle), name of the road, traffic signs included in the road, obstacles included in and/or nearby to the road, amount of traffic in the road, etc.

When a discrepancy is determined by the software model(s) 104 to exist, the software model(s) 104 can generate an annotation 106 (e.g., automatically without requiring human intervention). The annotation 106 can be used to generate a map update 120 for a region of the map 108 where the discrepancy was identified, without generating an update for other regions of the map 108 where the discrepancy was not identified. The annotation 106 can indicate the sensed property and/or sensed properties discrepant with the map 108, as well as any other information that would be relevant for ensuring that the sensed property is accounted for in the map 108. For example, the annotation 106 can indicate the presence of a road connecting from a first location to a second location, a shape of the road, number of lanes in the road, whether a road is available (e.g., not closed for construction), angle of the road (e.g., bank angle, incline angle), name of the road, traffic signs included in the road, obstacles included in and/or nearby to the road, amount of traffic in the road, etc. One or more signals representing the annotation 106 can then be sent over the network 128 to the compute device 114. In some implementations, the annotation 106 includes an indication of an unsafe condition (e.g., obstacle blocking road or closed road), which could cause analysis of that annotation 106 (i.e., generating the map update 120) to be prioritized.

The compute device 114 can be any type of compute device with a processor 124 and memory 116 operatively coupled to the processor 124. The compute device 114 can be, for example, a desktop computer, laptop, table, phone, server, internet-of-things device, etc. In some implementations, the vehicle 100 is associated with an entity, and the compute device 114 is associated with the same entity. For example, the vehicle 100 can be a truck operated, designed, and/or owned by PlusAI®, and the compute device 114 can be operated, authorized, accessible, and/or owned by PlusAI®.

The processor 124 can be, for example, a hardware based integrated circuit (IC) or any other suitable processing device configured to run and/or execute a set of instructions or code. For example, the processor 124 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 124 can be configured to run any of the methods and/or portions of methods discussed herein.

The memory 116 can be, for example, a random-access memory (RAM), a memory buffer, a hard drive, a read-only memory (ROM), an erasable programmable read-only memory (EPROM), and/or the like. The memory 116 can be configured to store sensor data collected by the sensor(s) 112, data received from a separate compute device (e.g., compute device 114), and any other data used by the processor 124 to perform the techniques discussed herein. In some instances, the memory 116 can store, for example, one or more software programs and/or code that can include instructions to cause the processor 124 to perform one or more processes, functions, and/or the like. In some implementations, the memory 116 can include extendible storage units that can be added and used incrementally. In some implementations, the memory 116 can be a portable memory (for example, a flash drive, a portable hard disk, and/or the like) that can be operatively coupled to the processor 124. In some instances, the memory 116 can be remotely operatively coupled with a compute device (not shown). For example, a remote database device can serve as a memory and be operatively coupled to the compute device 114.

The memory 116 can store a software model(s) 118. The software model(s) 104 can be, for example, an artificial intelligence (AI) model(s), a machine learning (ML) model(s), an analytical model(s), or a mathematical model(s). After the processor 124 has received the annotation 106 from the vehicle 100, the software model(s) 118 can use the annotation 106 to generate a map update 120 (e.g., software patch). The map update 120 can include information for updating the region of the map 108 associated with the discrepancy, and can be sent from the compute device 114 to the vehicle 100 and/or other vehicles (not shown) operatively coupled to network 128 and configured to receive the map update 120. The map update 120 can be associated with a shape, where the shape represents an area that is the same as the map region that is to be updated. The map update 120 can also be associated with a logical identifier, where the logical identifier identifies the particular map region of the map 108 to be updated. In some implementations, the shape and logical identifier associated with the map update 120 can be the same as the shape and logical identifier associated with the map region to be updated.

Once the vehicle 100 (e.g., processor 110) has received the map update 120, the software model(s) 104 can use the map update 120 to update the map 108 (e.g., automatically without requiring human input). This can cause the map 108 to be updated (i.e., fixed) to account for the previously detected discrepancy. The map region of the map 108 to be updated can replaced based on the map update 120. This can look for, for example, associating respective logical identifiers of the map update 120 and map region to be updated so that the software model(s) 104 can determine which map region of the map 108 the map update 120 is to update. Thereafter, the shape of the map update 120 can be aligned to and replace the map region to be updated. The aligning can include, for example, rotating and/or scaling the map update 120 (e.g., to ensure that roads are accurately aligned, to ensure that the map update 120 has a correct orientation relative to other regions of the map 108, etc.)

In some implementations, updating the map 108 with the map update 120 includes generating, analyzing, verifying, correcting, and/or smoothing a transition region positioned between a portion of the updated map 108 associated with the map update 120 and a portion of the updated map 108 that is not associated with the map update 120. The transition region can be aligned with each portion of the updated map 108 associated with the map update 108 and each portion of the updated map 108 that is not associated with the map update 120. The transition region can ensure geometric consistency and logical consistency (e.g., compensating for global positioning system (GPS) errors, lining up lane boundaries, etc.)

This updated map 108 can then be used by the vehicle 100 for navigation. Had the map 108 not been updated using the map update 120, the vehicle 100 and/or other vehicle relying on the map 108 may have operated in a different manner (e.g., taken a different route that is longer, tried to take a route that does not exist, ignored a traffic sign, not switched into a manual driving mode, etc.).

In some implementations, the map 108 is included in the memory 116 of the compute device 114 instead of the memory 102 of the vehicle 100. In such a scenario, the map update 120 can be used to update the map 108 at the compute device 114 instead of at the vehicle 100. Other vehicles, which can include vehicle 100, can use the map 108 stored in the memory 116 of the compute device 114 for navigation.

In some implementations, the map update 120 can be generated locally in the vehicle 100 without using the compute device 114. In some implementations, the software model(s) 104 can perform the functionalities of the software model(s) 118, including generating the map update 120 and using the map update 120 to generate an updated map 108.

In some implementations, the memory 102 does not include the software model(s) 104, annotation 106, and map 108. Instead, the functionalities of the software model(s) 104 can be performed by the software model(s) 118 of the compute device 114, including generating the annotation 106 (via sensor data collected by sensor(s) 112 and sent to the compute device 114) and updating the map 108 using the map update 120.

In some implementations, the map update 120 is sent to other vehicles (not shown), including the vehicle 100, where each vehicle includes copies of the map 108. Each of the vehicles can use the map update 120 to update maps stored within their respective memories.

In some implementations, the software model(s) 104 of the vehicle 100 can generate the map update 120 locally (using annotation 106) to update the map 108. Additionally, the annotation 106 (e.g., a copy) can be sent to the compute device 114 for (1) generating the map update 120 at the compute device 114, and (2) sending the map update 120 generated at the compute device 114 to other vehicles (not shown) that do not include vehicle 100.

In some implementations, the map update 120 and/or variations of the map update 120 can be sent to a plurality of vehicles that includes vehicle 100. In some implementations, a vehicle closer to a map region that is to be updated can receive a map update with at least enough information to avoid a dangerous situation (e.g., that a road no longer exists), while a vehicle further away from the map region can receive a map update with more information that may not be necessary to know for avoiding a dangerous situation, but can still be desirable to know (e.g., that a new road has been built). In some implementations, a vehicle closer to a map region that to be updated can receive the map update 120 before a different vehicle that is further away from the map region that is to be updated.

In some implementations, the map update 120 is sent to a plurality of vehicles that includes the vehicle 100, based on a priority list. For instance, only vehicles included in the priority list receive the map update 120, and vehicles not included in the priority list do not receive the map update 120, receive the map update 120 later, and/or receive a different map update different than the map update 120. The priority list can include, for example, only vehicles included in the map region to be updated, only vehicles included in the map region to be updated and map regions adjacent to the map region to be updated, only vehicles within a predetermined radius (e.g., 5 miles, 10 miles, 25 miles, 50 miles, 100 miles, 250 miles, 500 miles, etc.) of a location associated with a discrepancy, only fully autonomous driving vehicles, only semi-autonomous vehicles, only semi-trucks, a combination thereof, etc.

In some implementations, prior to the map update 120 being sent to the vehicle 100, a human (user) verifies, at the compute device 114 and/or a different compute device (not shown) communicable coupled to the compute device 114, that the map update 120 should be sent to the vehicle 100 and/or other vehicles. In some implementations, a graphical user interface (GUI) can be included in the compute device 114 (not shown in FIG. 1). A representation of the map update 120 (e.g., shape, logical identifier, roads, obstacles, signs, etc.) can be shown to a user via the GUI, and the user can verify that the map update 120 is accurate and/or properly aligned. After the user verifies that the map update 120 is accurate and/or properly aligned, the map update 120 can be sent from the compute device 114 to the vehicle 100 and/or other vehicles.

In some implementations, the map update 120 is generated and sent to the vehicle 100 and/or other vehicles automatically without requiring human input. In some implementations, the map 108 is updated automatically in response to receiving the map update 120. In some implementations, a passenger of the vehicle 100 (e.g., driver) may receive an indication (e.g., notification) that a map update 120 has been received. Further, the passenger can decide if the map 108 should be updated now or later (e.g., at a predetermined time or a time specified by the passenger).

In some implementations, the vehicle 100 is caused to perform at least one remedial action in response to the software model(s) 104 determining that a discrepancy exists. For example, the vehicle 100 can receive a signal (e.g., generated by processor 110) that causes the vehicle 100 to operate in a manual driving mode or semi-autonomous driving mode until the map 108 has been updated with the map update 120. As another example, the vehicle 100 can be prevented from operating in a semi-autonomous and/or fully autonomous driving mode until the map 108 has been updated with the map update 120.

In some implementations, the compute device 114 is caused to (e.g., receives a signal instructing the compute device 114 to) perform at least one remedial action in response to receiving an annotation 106. For example, the at least one remedial action can be to send a warning signal to another vehicle(s) that is near (e.g., heading towards) the area associated with the discrepancy (e.g., to warn a driver of the vehicle, to cause the vehicle to operate in a manual driving mode, to cause the vehicle to gather extra sensor data, etc.).

In some implementations, an indication of the vehicle's 100 location and/or an estimated location of the discrepancy, such as GPS coordinates, are sent from the vehicle 100 to the compute device 114 before, at the same time as, and/or after the annotation 106 is sent. This location indication can allow the compute device 114 to be made aware of and/or estimate the map region to be updated.

In some implementations, the map update 120 has a file size less than at least one of: 2 megabytes (MB), 1 MB, 0.5 MB, or 0.25 MB. In some implementations, the map 108 has a file size greater than at least one of: 1 gigabyte (GB), 5 GB, 10 GB, 25 GB, 40 GB, 45 GB, 50 GB, 55 GB, or 60 GB. In some implementations, the map update 120 has a file size less than a file size of the map 108. In some implementations, the map update 120 has a file size less than at least one of 1%, 2%, 3%, 5%, 10%, 20%, 25%, 50%, or 75% of the map's 108 file size.

In some implementations, the map 108 is updated based on the map update 120 to account for a discrepancy within at least one of: one day from the software model(s) 104 detecting the discrepancy, four hours from the software model(s) 104 detecting the discrepancy, three hours from the software model(s) 104 detecting the discrepancy, two hours from the software model(s) 104 detecting the discrepancy, or one hour from the software model(s) 104 detecting the discrepancy.

In some implementations, the map update 120 causes a discrete, contiguous area of the map 108 to be replaced. The region of the map 108 associated with the discrepancy can be replaced, while other regions of the map not associated with the discrepancy are not. For example, if the map 108 is of New York City, the map update 120 can cause Manhattan to be replaced, while not changing other map regions (e.g., Bronx, Brooklyn, Queens, and Staten Island).

In some implementations, if the vehicle 100 is not able to communicate with the compute device 114 (e.g., the network 128 is down, circuitry for communicating in the compute device 114 and/or vehicle 100 is not working, etc.), the annotation 106 and/or map update 120 can be scheduled for a future transmission (e.g., when the network 128 becomes available, circuitry for communicating in the compute device 114 and/or vehicle 100 is working, etc.) to trigger generation of the map update 120 (in response to receiving the annotation 106) and/or updated version of the map 108 (in response to receiving the map update 120).

Although the above discussion relates to updating a map 108 using a map update 120 and an annotation 106, it can be appreciated that any number of map updates and annotations can be generated for any number of maps. For example, a second annotation (different than annotation 106) can be generated based on a different sensed property, and a second map update (different than map update 120) can be used to update the map 108 and/or a second map stored in memory 102 of the vehicle 100 that is different than map 108.

Figure 2:
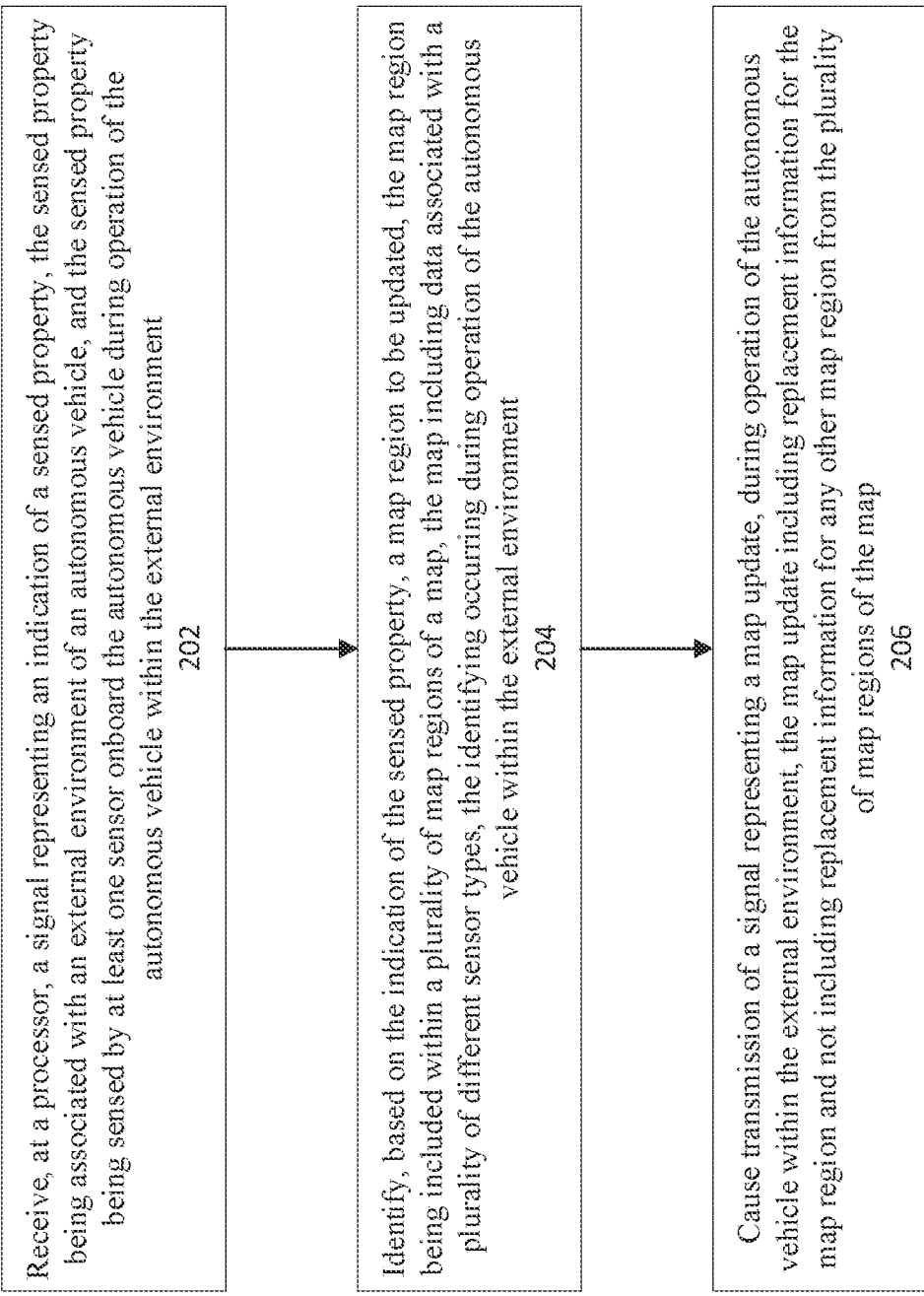
FIG. 2 shows a flowchart of a method for generating a map update to cause a map region of a map to be updated, according to an embodiment.

FIG. 2 shows a flowchart of a method for generating a map update to cause a map region of a map to be updated, according to an embodiment. In some implementations, the method of FIG. 2 can be performed by the processor 124 of the compute device 114.

At 202, a signal representing an indication of a sensed property is received at a processor (e.g., processor 124). The sensed property is associated with an external environment of an autonomous vehicle (e.g., vehicle 100), and the sensed property is sensed by at least one sensor (e.g., sensor(s) 112) onboard the autonomous vehicle during operation (e.g., running and/or moving) of the autonomous vehicle within the external environment. In some implementations, the sensed property is a topographical feature, such as a size, location, shape, type, or height associated with a topography of the external environment (e.g., road, building, lake, etc.). In some implementations, the sensor property indicates a discrepancy compared to an expected topographical feature as indicated by a map (e.g., map 108) used by the autonomous vehicle for navigation.

At 204, based on the indication of the sensed property, a map region to be updated is identified. The map region is included within a plurality of map regions of a map. The map includes data associated with a plurality of different sensor types (e.g., the map created and/or modified using sensors of different sensor types, such as at least two of a camera, radar, or lidar), and the identifying occurs during operation of the autonomous vehicle within the external environment. In some implementations, the map region can be identified based on an annotation (e.g., annotation 106) of the map. In some implementations, the annotation can include GPS coordinates, where the GPS coordinates can indicate an approximate location associated the sensed property. In some implementations, step 204 can be performed in response to completing step 202 automatically and without requiring human input.

At 206, a signal representing a map update (e.g., map update 120) is caused to be transmitted (e.g., the processor sends an electrical signal to a transmitter and/or transceiver operatively coupled to the processor instructing the signal representing the map update to be transmitted) during operation of the autonomous vehicle within the external environment. The map update includes replacement information for the map region and does not include replacement information for any other map region from the plurality of map regions of the map. The signal can be sent, for example, to the autonomous vehicle and/or each autonomous vehicle from a plurality of autonomous vehicles (e.g., based on a priority list). In some implementations, step 206 is performed automatically and without requiring human input in response to the map update being generated.

Figure 3:
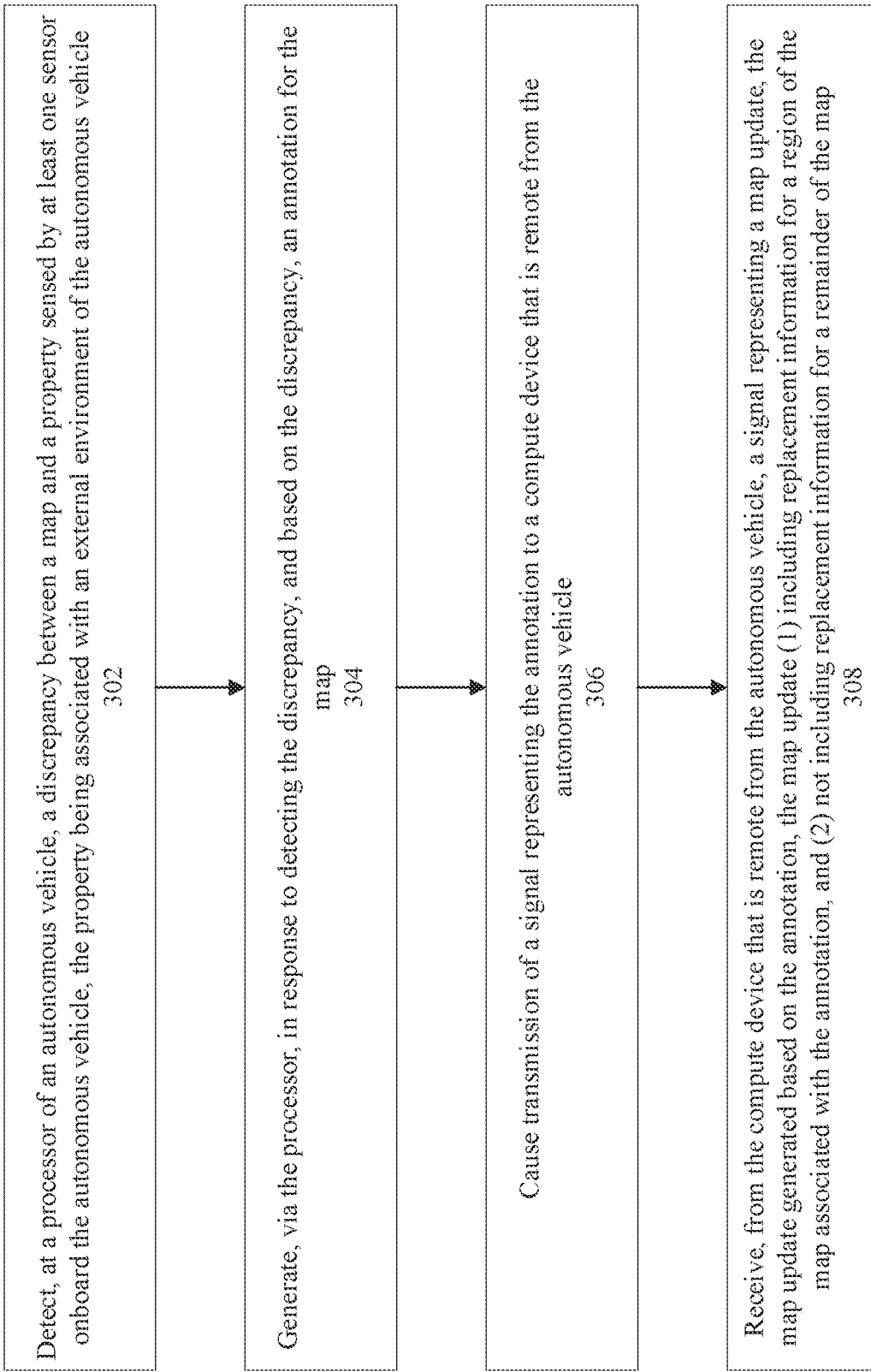
FIG. 3 shows a flowchart of a method for receiving a map update based on detecting a discrepancy, according to an embodiment.

FIG. 3 shows a flowchart of a method for receiving a map update based on detecting a discrepancy, according to an embodiment. In some implementations, the method of FIG. 3 can be performed by the processor 110 of the vehicle 100.

At 302, a discrepancy between a map (e.g., map 108) and a property sensed by at least one sensor (e.g., sensor(s) 112) onboard the autonomous vehicle is detected at a processor (e.g., processor 110) of an autonomous vehicle (e.g., vehicle 100). The property is associated with an external environment of the autonomous vehicle. The property can be, for example, a topographical feature of the external environment, such as an attribute of a road or obstacle.

At 304, in response to detecting the discrepancy, and based on the discrepancy, an annotation (e.g., annotation 106) for the map is generated via the processor. The annotation can indicate the property discrepant with the map, as well as any other information that would be relevant for ensuring that the property is accounted for in the map (e.g., included and/or removed). In some implementations, the annotation can be generated automatically without requiring human input in response to detecting the discrepancy at 302.

At 306, a signal representing the annotation to a compute device (e.g., compute device 114) that is remote from the autonomous vehicle is caused to be transmitted (e.g., the processor sends an electrical signal to a transmitter and/or transceiver operatively coupled to the processor instructing the signal representing the annotation to be transmitted). In some implementations, the compute device is owned, operated, and/or authorized by an entity, and the autonomous vehicle is also owned, operated, and/or authorized by the same entity. In some implementations, the signal can be transmitted without requiring human input in response to generating the annotation at 304.

At 308, a signal representing a map update (e.g., map update 120) is received from the compute device that is remote from the autonomous vehicle. The map update generated based on the annotation (e.g., by software model(s) 118). The map update (1) includes replacement information for a region of the map associated with the annotation, and (2) does not include replacement information for a remainder of the map. In some implementations, 308 is performed as the autonomous vehicle 100 is operating (e.g., driving).

In some implementations, after performing 308, the map is updated, via the processor and during operation of the autonomous vehicle, based on the map update, to generate an updated map. The map can be updated (e.g., by software model(s) 104) in response to receiving the signal at 308 automatically and without requiring human input. In some implementations, the autonomous vehicle is navigated based on the updated map.

In some implementations, the property at 302 is a first property, and a second property associated with the external environment of the autonomous vehicle is detected by the at least one sensor in response to detecting the discrepancy. The map update is generated further based on the second property. The second property can be different than the first property.

FIG. 4 shows a flowchart of a method for updating a region of a map to generate an updated map for navigating an autonomous vehicle, according to an embodiment. In some implementations, the method of FIG. 4 can be performed by the processor 110 of the vehicle 100.

At 402, a difference is detected between (1) sensor data generated by at least one sensor (e.g., sensor(s) 112) onboard an autonomous vehicle (e.g., vehicle 100), and (2) a map (e.g., map 108) stored in a memory (memory 102) operably coupled to the processor. The sensor data is associated with an external environment of the autonomous vehicle. At 404, in response to detecting the difference between the sensor data and the map (e.g., automatically without requiring human input), an annotation (e.g., annotation 106) for the map is detected. The annotation can be associated with only a map region of the map (i.e., not the entire map). At 406, a first signal representing the annotation is caused to be transmitted (e.g., the processor sends an electrical signal to a transmitter and/or transceiver operatively coupled to the processor instructing the first signal to be transmitted) to a compute device (e.g., compute device 114) that is remote from the autonomous vehicle. At 408, a second signal representing a map update (e.g., map update 120) is received from the compute device that is remote from the autonomous vehicle. The map update is generated based on the annotation. The map update (1) includes replacement information for a region of the map associated with the annotation, and (2) does not include replacement information for a remainder of the map. At 410, the autonomous vehicle is navigated based on the updated map.

In some implementations, the method of FIG. 4 further includes automatically causing detection of additional sensor data in response to detecting the difference between the first sensor data and the map. For instance, the sensor data at 402 may not include enough information/data to generate the annotation at 404. In such a case, the additional sensor data can be collected. For example, the sensor data at 402 may indicate that a new road has been constructed, and the additional sensor data can indicate attributes of the new road, such as the new road's approximate location, shape, number of lanes, etc. Thereafter, a third signal can be transmitted to the compute device that is remote from the autonomous vehicle, to trigger generation of the map update in response to the detection of the additional sensor data.

In some implementations, the method of FIG. 4 further includes causing transmission of a third signal to the compute device that is remote from the autonomous vehicle to trigger generation of the map update in response to receiving the third signal. In such a case, the first signal sent at 406 does not cause the compute device that is remote from the autonomous vehicle to trigger generation of the map update. The third signal can be sent, for example, when a network connection has a strength above a predetermined threshold, when a network connection is established and/or verified to be established, etc.

In an embodiment, a method comprises: receiving, at a processor, a signal representing an indication of a sensed property, the sensed property being associated with an external environment of an autonomous vehicle, and the sensed property being sensed by at least one sensor onboard the autonomous vehicle during operation of the autonomous vehicle within the external environment; identifying, based on the indication of the sensed property, a map region to be updated, the map region being included within a plurality of map regions of a map, the map including data associated with a plurality of different sensor types, the identifying occurring during operation of the autonomous vehicle within the external environment; and causing transmission of a signal representing a map update, during operation of the autonomous vehicle within the external environment, the map update including replacement information for the map region and not including replacement information for any other map region from the plurality of map regions of the map.

In some implementations, the identifying the map region is based on an annotation of the map, the annotation received from the autonomous vehicle.

In some implementations, the sensed property is a topographical feature.

In some implementations, the map update has a file size of less than about 1 megabyte (MB).

In some implementations, the transmission of the signal representing the map update is to the autonomous vehicle.

In some implementations, the transmission of the signal representing the map update is to each autonomous vehicle from a plurality of autonomous vehicles that includes the autonomous vehicle.

In some implementations, the transmission of the signal representing the map update is to each autonomous vehicle from a plurality of autonomous vehicles that includes the autonomous vehicle, and is based on a priority list.

In some implementations, the map update replaces a discrete, contiguous area of the map.

In an embodiment, a method comprises: detecting, at a processor of an autonomous vehicle, a discrepancy between a map and a property sensed by at least one sensor onboard the autonomous vehicle, the property being associated with an external environment of the autonomous vehicle; generating, via the processor, in response to detecting the discrepancy, and based on the discrepancy, an annotation for the map; causing transmission of a signal representing the annotation to a compute device that is remote from the autonomous vehicle; and receiving, from the compute device that is remote from the autonomous vehicle, a signal representing a map update, the map update generated based on the annotation, the map update (1) including replacement information for a region of the map associated with the annotation, and (2) not including replacement information for a remainder of the map.

Some implementations further comprise: updating the map, via the processor and during operation of the autonomous vehicle, based on the map update, to generate an updated map; and navigating the autonomous vehicle based on the updated map.

In some implementations, the updating the map includes: aligning a shape of the map update with at least a portion of the map; and associating a logical identifier of the map update with a logical identifier of the map.

In some implementations, the updated map includes a transition region positioned between a portion of the updated map associated with the map update and a portion of the updated map that is not associated with the map update, the transition region being aligned with each of the portion of the updated map associated with the map update and the portion of the updated map that is not associated with the map update.

In some implementations, the property is a first property, the method further comprising: detecting, by the at least one sensor onboard the autonomous vehicle, a second property associated with the external environment of the autonomous vehicle, in response to detecting the discrepancy, the map update generated further based on the second property.

In some implementations, the property is a topographical feature of the external environment.

In an embodiment, a non-transitory, processor-readable medium storing processor-executable instructions to cause a processor to: detect a difference between (1) sensor data generated by at least one sensor onboard an autonomous vehicle, and (2) a map stored in a memory operably coupled to the processor, the sensor data being associated with an external environment of the autonomous vehicle; generate, in response to detecting the difference between the sensor data and the map, an annotation for the map; cause transmission of a first signal representing the annotation to a compute device that is remote from the autonomous vehicle; receive, from the compute device that is remote from the autonomous vehicle, a second signal representing a map update, the map update generated based on the annotation, the map update (1) including replacement information for a region of the map associated with the annotation, and (2) not including replacement information for a remainder of the map; and navigate the autonomous vehicle based on the updated map.

In some implementations, the map update has a file size of less than about 1 megabyte (MB).

In some implementations, the map update has a file size that is less than a file size of the map.

In some implementations, the sensor data is first sensor data, the medium further storing processor-executable instructions to cause the processor to: automatically cause detection of additional sensor data in response to detecting the difference between the first sensor data and the map; and cause transmission of a third signal to the compute device that is remote from the autonomous vehicle, to trigger generation of the map update in response to the detection of the additional sensor data.

In some implementations, the non-transitory, processor-readable medium further stores processor-executable instructions to cause the processor to cause transmission of a third signal to the remote compute device that is remote from the autonomous vehicle to trigger generation of the map update in response to receiving the third signal.

In some implementations, the non-transitory, processor-readable medium further stores processor-executable instructions to cause the processor to: in response to detecting that a communications network is unavailable, schedule a future transmission of a third signal to a remote compute device to trigger generation of the map update in response to receiving the third signal.

In some implementations, the annotation includes an indication of an unsafe condition.

In some implementations, the generation of the map update includes: aligning a shape of the map update with at least a portion of the map; and associating a logical identifier of the map update with a logical identifier of the map.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java®, Ruby™, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog™), object-oriented programming languages (e.g., Java®, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
   receiving, at a processor, a first signal representing an indication of a sensed property, the sensed property being associated with an external environment of a vehicle, and the sensed property being sensed by at least one sensor onboard the vehicle during operation of the vehicle within the external environment;
   identifying, based on the indication of the sensed property, a map region to be updated, the map region being included within a plurality of map regions of a map, the map including data associated with a plurality of different sensor types, the identifying occurring during operation of the vehicle within the external environment;
   causing transmission of a second signal to a remote compute device to trigger generation of a map update for the map region;
   in response to detecting that a communications network is unavailable, scheduling a future transmission of a third signal to the remote compute device to trigger the generation of the map update; and
   receiving, at the processor, a fourth signal representing the map update, during operation of the vehicle within the external environment, the map update (1) including replacement information for the map region, and (2) not including replacement information for any other map region from the plurality of map regions of the map.

2. The method of claim 1, wherein the identifying of the map region is based on an annotation of the map.

3. The method of claim 1, wherein the sensed property is a topographical feature.

4. The method of claim 1, wherein the map update has a file size of less than about 1 megabyte (MB).

5. The method of claim 1, wherein the processor is onboard the vehicle.

6. The method of claim 1, wherein the fourth signal representing the map update is sent to each vehicle from a plurality of vehicles that includes the vehicle.

7. The method of claim 6, wherein the fourth signal representing the map update is sent to each vehicle from the plurality of vehicles based on a priority list.

8. The method of claim 1, wherein the map update replaces a discrete, contiguous area of the map.

9. An apparatus, comprising:
   a processor configured to be included in a vehicle; and
   a memory operably coupled to the processor, the memory storing instructions that when executed by the processor cause the processor to perform operations comprising:
      detect a discrepancy between a map and a property sensed by at least one sensor onboard the vehicle, the property being associated with an external environment of the vehicle;
      generate, in response to detecting the discrepancy, and based on the discrepancy, an annotation for the map;
      cause transmission of a first signal representing the annotation to a compute device that is remote from the vehicle, to trigger generation of a map update based on the annotation, the map update (1) including replacement information for a region of the map associated with the annotation, and (2) not including replacement information for a remainder of the map;

in response to detecting that a communications network is unavailable, schedule a future transmission of a second signal to the compute device that is remote from the vehicle, to trigger the generation of the map update; and receive, from the compute device that is remote from the vehicle, a third signal representing the map update.

10. The apparatus of claim 9, wherein the memory further stores instructions that when executed cause the processor to:

update the map, via the processor and during operation of the vehicle, based on the map update, to generate an updated map; and navigate the vehicle based on the updated map.

11. The apparatus of claim 10, wherein the instructions to update the map include an instruction that when executed causes the processor to:

align a shape of the map update with at least a portion of the map; and associate a logical identifier of the map update with a logical identifier of the map.

12. The apparatus of claim 10, wherein the updated map includes a transition region positioned between a portion of the updated map associated with the map update and a portion of the updated map that is not associated with the map update, the transition region being aligned with each of the portion of the updated map associated with the map update and the portion of the updated map that is not associated with the map update.

13. The apparatus of claim 9, wherein the property is a first property, the method further comprising:

detecting, by the at least one sensor onboard the vehicle, a second property associated with the external environment of the vehicle, in response to detecting the discrepancy, the map update generated further based on the second property.

14. The apparatus of claim 9, wherein the property is a topographical feature of the external environment.

15. A non-transitory, processor-readable medium storing processor-executable instructions to cause a processor to perform operations comprising:

detect a difference between (1) sensor data generated by at least one sensor onboard a vehicle, and (2) a map stored in a memory operably coupled to the processor, the sensor data being associated with an external environment of the vehicle;

generate, in response to detecting the difference between the sensor data and the map, an annotation for the map;

cause transmission of a first signal representing the annotation to a compute device that is remote from the vehicle, to trigger generation of a map update based on the annotation, the map update (1) including replacement information for a region of the map associated with the annotation, and (2) not including replacement information for a remainder of the map;

in response to detecting that a communication network is unavailable, schedule a future transmission of a second signal to the compute device that is remote from the vehicle, to trigger the generation of the map update;

receive, from the compute device that is remote from the vehicle, a third signal representing the map update; and navigate the vehicle based on the map update.

16. The non-transitory, processor-readable medium of claim 15, wherein the map update has a file size of less than about 1 megabyte (MB).

17. The non-transitory, processor-readable medium of claim 15, wherein the map update has a file size that is less than a file size of the map.

18. The non-transitory, processor-readable medium of claim 15, wherein the sensor data is first sensor data, the medium further storing processor-executable instructions to cause the processor to:

automatically cause detection of additional sensor data in response to detecting the difference between the first sensor data and the map; and cause transmission of a fourth signal to the compute device that is remote from the vehicle, the map update generated further based on the additional sensor data.

19. The non-transitory, processor-readable medium of claim 15, further storing processor-executable instructions to cause the processor to:

cause transmission of a fourth signal to the compute device that is remote from the vehicle to trigger generation of an updated map in response to receiving the third signal.

20. The non-transitory, processor-readable medium of claim 15, wherein the vehicle is an autonomous vehicle.

21. The non-transitory, processor-readable medium of claim 15, wherein the annotation includes an indication of an unsafe condition.

22. The non-transitory, processor-readable medium of claim 15, wherein the generation of the map update includes:

aligning a shape of the map update with at least a portion of the map; and associating a logical identifier of the map update with a logical identifier of the map.

* * * * *